3,107,996
PROCESS FOR SEPARATING COBALT AND
NICKEL FROM AMMONIACAL SOLUTIONS
Ernst M. Goldstein, Newfield, N.J.
No Drawing. Filed Sept. 19, 1960, Ser. No. 56,673
1 Claim. (Cl. 75—108)

This invention relates to the separation of nickel and cobalt from an ammoniacal solution in which they are dissolved and more particularly to a process in which the cobalt is selectively precipitated from the solution to provide eventually a nickel compound containing so little cobalt as to be commercially acceptable to a greater extent than heretofore.

A prior art process is known (Caron Patent 1,487,145) wherein nickel is extracted from nickeliferous ores containing some cobalt by reducing such ores in a furnace, next leaching the calcined ores in an ammoniacal solution to extract the nickel and the cobalt, and finally distilling the decanted product liquor to cause the nickel and cobalt to precipitate as nickel and cobalt compounds. In theory, such compounds will precipitate sequentially from the product liquor during distillation if most of the cobalt is in either the cobaltous or the cobaltic state and can be selectively filtered from the liquor. In actual practice, however, the two precipitates form practically simultaneously because of the presence in the product liquor of certain sulfur contaminants which tend so to affect the cobalt as to distribute it between the two states. It is therefore not commercially practical to separate the nickel and the cobalt by the known process so that after the intermixed nickel and cobalt compounds are calcined to form oxides of nickel and cobalt, the combined oxides, which are mainly nickel, are employed in industry wherever the amount of contained cobalt is not considered deleterious.

The foregoing inability to separate the cobalt from the nickel creates a number of disadvantages. Thus, if the amount of cobalt in the ore is so great that the finished oxides contain more than one part cobalt to one hundred parts nickel, the oxides have a considerably reduced market. To avoid this condition, it is customary to operate the process inefficiently in the leaching phase to limit the extraction of cobalt and thus produce a commercially acceptable product. However, this remedy has the effect of simultaneously lowering the amount of nickel eventually recovered leading to wastage of the nickel which ends up in the plant tailing heap.

The present invention contemplates a process in which the product liquor is treated with sodium formaldehydesulfoxylate ($CH_2OH$—$O$—$S$—$O$—$Na$) as a reducing agent, thus converting most of the cobaltic compounds therein to the cobaltous form. The cobaltous compounds will precipitate upon distillation of the product liquor prior to any substantial precipitation of the nickel compounds thereby providing a means for selectively separating the cobalt and the nickel.

An object of the present invention is to provide a process whereby cobalt is precipitated selectively from an ammoniacal solution containing nickel and cobalt by contacting such solution with a reducing agent before distillation of such solution.

Another object of the invention is the provision of a process whereby cobalt is precipitated selectively from an ammoniacal solution containing nickel and cobalt by mixing therewith a chemical reducing agent before distillation of such solution.

A final object is to provide a process whereby cobalt is precipitated selectively from an ammoniacal solution containing nickel and cobalt by mixing with the solution solid sodium formaldehydesulfoxylate.

Other objects and many of the attendant advantages of this invention will be readily appreciated as the same becomes better understood by reference to the following detailed description.

The novel process disclosed herein is intended to be employed in conjunction with the well known Caron process mentioned heretofore for recovering nickel from nickeliferous ore containing cobalt and iron such as is found in Cuba in considerable quantities. The ore is dried to reduce substantially the moisture content, is ground to produce a finely divided mass, and is fed into the top of a vertical multiple hearth reduction furnace through which it passes downwardly at a slow rate. Undiluted producer gas is introduced at a low point in the furnace and combustion gases may be introduced at various higher levels which cause the ore to be preheated to a temperature of about 600° C. and then to be slowly heated in a reducing atmosphere to a final temperature between 700° C. and 850° C.

The calcined ore is cooled after it leaves the furnace and is eventually treated with an ammoniacal solution of ammonium carbonate to leach out the nickel and cobalt. The ammoniacal solution is allowed to settle for a sufficient time to permit decantation of a product liquor containing a large percentage of the nickel in the ore and much of the cobalt. The product liquor is passed through a bubble tower countercurrent to a flow of steam which distills the ammonia and other dissolved gases such as carbon dioxide from the product liquor thereby causing the nickel and cobalt to precipitate generally in the form of carbonates. These carbonates may then be calcined to form oxides which are commercially useful. As previously pointed out, the nickel and cobalt co-precipitate and provide a final product which has more limited use than would a nickel product having a smaller cobalt content.

The present invention departs from the foregoing process by mixing the product liquor before decantation and prior to distillation with sodium formaldehydesulfoxylate which has the effect of causing reduction of substantially all of the cobaltic compounds to the cobaltous form in which form the cobalt will precipitate in the very early stages of distillation in advance of most of the nickel whereby the cobalt compounds may be separated selectively from the product liquor as by filtration or other separating methods. Very little of the nickel compounds will precipitate at this time so that it is possible to recover most of the nickel during subsequent distillation and relatively free of cobalt.

*Example 1*

In order to test the efficacy of the foregoing reduction process, a number of product liquor samples containing varying amounts of cobalt with respect to the nickel content were treated with varying amounts of sodium formaldehydesulfoxylate. Thereafter, each product liquor was partially distilled until a fairly heavy precipitate appeared. The precipitate was separated from the remaining liquor and analyzed to determine what percentages of the nickel and cobalt originally in the product liquor were precipitated. From these figures, the parts cobalt to one hundred parts nickel remaining in the filtrate were calculated. The results of these tests are shown in the following table:

| Liquor compositions, g./100 ml. | | | Reducing agent | | Precip. | | Filtrate, pts. Co/ 100 pts. Ni |
|---|---|---|---|---|---|---|---|
| Ni | Co | Pts. Co/ 100 pts. Ni | G./100 ml. solution | G. per g. Co | Percent Ni | Percent Co | |
| 1.218 | 0.0286 | 2.35 | 0.0486 | 1.7 | 7.1 | 37 | 1.7 |
| 1.218 | 0.0286 | 2.35 | 0.0581 | 2.03 | 10.0 | 55 | 1.2 |
| 1.218 | 0.0286 | 2.35 | 0.0657 | 2.3 | 9.4 | 70 | 0.74 |
| 1.212 | 0.0286 | 2.36 | 0.0657 | 2.3 | 9.3 | 70.7 | 0.71 |
| 1.199 | 0.0291 | 2.43 | 0.0698 | 2.4 | 10.9 | 76 | 0.56 |
| 1.212 | 0.0286 | 2.36 | 0.08 | 2.8 | 9.0 | 69.0 | 0.78 |

A study of the table shows that sodium formaldehydesulfoxylate is particularly suitable for reducing the cobalt from its cobaltic to the cobaltous form, in which form it precipitates selectively from the product liquor after partial distillation thereof. Although some nickel is also precipitated, the remaining solution has considerably fewer parts of cobalt to one hundred parts of nickel than did the original product liquor as a comparison of columns 3 and 8 will show. Column 8 also shows that when a sufficient amount of the reducing agent is used, the parts of cobalt to one hundred parts of nickel are brought below the preferred commercial maximum of one. When one considers that upon distillation of the untreated product liquor, the cobalt and nickel are precipitated in substantially equal percentages so that there is no possibility of achieving selective precipitation, the results produced by a simple treatment with this reducing agent seem quite remarkable. The precipitation with sodium formaldehydesulfoxylate is preferably carried out in an oxygen-poor atmosphere. The precipitate obtained with sodium formaldehydesulfoxylate is soluble in ammoniacal solutions of ammonium carbonate as well as in mineral acids such as sulfuric acid or hydrochloric acid. If the recovery of the small amount of co-precipitated nickel is desirable further processing of the precipitate is necessary using conventional separation methods. As some of these methods work in ammoniacal solutions (e.g. the hydrogen reduction of nickel ahead of cobalt) and some in acid medium (e.g. the cobalt precipitation with hypochlorite solution) no limitations are encountered as to the preferred method because the precipitate can be dissolved in acid and ammoniacal media and the solution is then ready for further processing.

It will be apparent that a novel process has been described whereby cobalt can be selectively precipitated from an ammoniacal solution containing cobalt and nickel. It should be understood, however, that the foregoing disclosure relates to only preferred embodiments of the invention and that numerous modifications and alterations may be made therein without departing from the spirit and scope of the invention as set forth in the appended claim.

What is claimed and desired to be protected by Letters Patent of the United States is:

In the recovery of nickel from an ammoniacal leach solution containing ammonium carbonate, nickel, cobalt and the usual impurities, the process of obtaining the nickel content substantially free of cobalt which comprises mixing sodium formaldehydesulfoxylate with the solution, distilling the solution until a substantial amount of the cobalt in the solution in cobaltous form is selectively precipitated, and separating the precipitate from the remaining solution.

References Cited in the file of this patent

UNITED STATES PATENTS 2,913,336   Dean _____ Nov. 17, 1959